US012400545B2

(12) United States Patent
Suzuki

(10) Patent No.: US 12,400,545 B2
(45) Date of Patent: Aug. 26, 2025

(54) INFORMATION PROCESSING APPARATUS, INFORMATION PROCESSING METHOD, AND NON-TRANSITORY COMPUTER READABLE MEDIUM FOR ASSIGNMENT OF A PARCEL AS A PARKING SLOT

(71) Applicant: TOYOTA JIDOSHA KABUSHIKI KAISHA, Toyota (JP)

(72) Inventor: Yukari Suzuki, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/458,600

(22) Filed: Aug. 30, 2023

(65) Prior Publication Data

US 2024/0078905 A1 Mar. 7, 2024

(30) Foreign Application Priority Data

Sep. 7, 2022 (JP) ................................. 2022-142479

(51) Int. Cl.
*G08G 1/14* (2006.01)

(52) U.S. Cl.
CPC ............. *G08G 1/148* (2013.01); *G08G 1/144* (2013.01); *G08G 1/146* (2013.01)

(58) Field of Classification Search
None
See application file for complete search history.

(56) References Cited

U.S. PATENT DOCUMENTS

| | | | | |
|---|---|---|---|---|
| 5,646,853 | A * | 7/1997 | Takahashi | G08G 1/08 348/149 |
| 2015/0088790 | A1* | 3/2015 | Chidlovskii | G06Q 30/0202 706/12 |
| 2017/0267233 | A1* | 9/2017 | Minster | B60W 30/06 |
| 2018/0253101 | A1* | 9/2018 | Banzhaf | G05D 1/0212 |
| 2020/0168091 | A1* | 5/2020 | Batra | G08G 1/065 |

FOREIGN PATENT DOCUMENTS

| | | | |
|---|---|---|---|
| JP | 2000-76423 | A | 3/2000 |
| JP | 2002-74431 | A | 3/2002 |
| JP | 2002-169957 | A | 6/2002 |
| JP | 2016-19166 | A | 2/2016 |
| JP | 2019-120982 | A | 7/2019 |

* cited by examiner

*Primary Examiner* — John F Mortell
(74) *Attorney, Agent, or Firm* — Sughrue Mion, PLLC

(57) ABSTRACT

An information processing apparatus includes an interface configured to be able to acquire information regarding a parcel, and a controller configured to generate, based on the information regarding the parcel, information regarding assignment of the parcel as a parking slot.

20 Claims, 4 Drawing Sheets

INFORMATION PROCESSING APPARATUS, INFORMATION PROCESSING METHOD, AND NON-TRANSITORY COMPUTER READABLE MEDIUM FOR ASSIGNMENT OF A PARCEL AS A PARKING SLOT

CROSS-REFERENCE TO RELATED APPLICATION

This application claims priority to Japanese Patent Application No. 2022-142479, filed on Sep. 7, 2022, the entire contents of which are incorporated herein by reference.

TECHNICAL FIELD

The present disclosure relates to an information processing apparatus, an information processing method, and a non-transitory computer readable medium.

BACKGROUND

Parking space rental and management systems to smoothly match demands for parking spaces with parking spaces in underutilized conditions by disclosing real-time usage status of the parking spaces are known (see, for example, Patent Literature (PTL) 1).

CITATION LIST

Patent Literature

PTL 1: JP 2019-120982 A

SUMMARY

Not only spaces available as parking slots but also vacant spaces that can be used for parking are required to be used as parking spaces.

It would be helpful to make effective use of vacant spaces that can be used for parking, as parking spaces.

An information processing apparatus according to an embodiment of the present disclosure includes:

- an interface configured to be able to acquire information regarding a parcel; and
- a controller configured to generate, based on the information regarding the parcel, information regarding assignment of the parcel as a parking slot.

An information processing method according to an embodiment of the present disclosure includes:

- acquiring information regarding a parcel; and
- generating, based on the information regarding the parcel, information regarding assignment of the parcel as a parking slot.

A non-transitory computer readable medium according to an embodiment of the present disclosure stores an information processing program. The information processing program is configured to cause a processor to execute operations, the operations including:

- acquiring information regarding a parcel; and
- generating, based on the information regarding the parcel, information regarding assignment of the parcel as a parking slot.

According to the information processing apparatus, the information processing method, and the non-transitory computer readable medium of the embodiments of the present disclosure, vacant spaces that can be used for parking can be effectively used as parking spaces.

DETAILED DESCRIPTION (Configuration of Information Processing System 1)

An information processing system 1 according to an embodiment provides a service that finds parcels that can be used as parking slots from among various vacant spaces in business districts, residential areas, or the like, and suggests the use of the parcels as parking slots to owners of the parcels. The information processing system 1 may provide a service that actually assigns and manages the parcels as parking slots. The information processing system 1 may provide a service that introduces the parcels that can be used as parking slots to users who are looking for parking slots. The information processing system 1 may provide a service that links a service that suggests the use of parcels as parking slots with a service that manages the parking slots or introduces the parking slots. Owners of parcels to be used as parking slots, or contractors entrusted by the owners to manage the parcels are also referred to as lending users. Users who use the parking slots are also referred to as using users.

Figure 1:
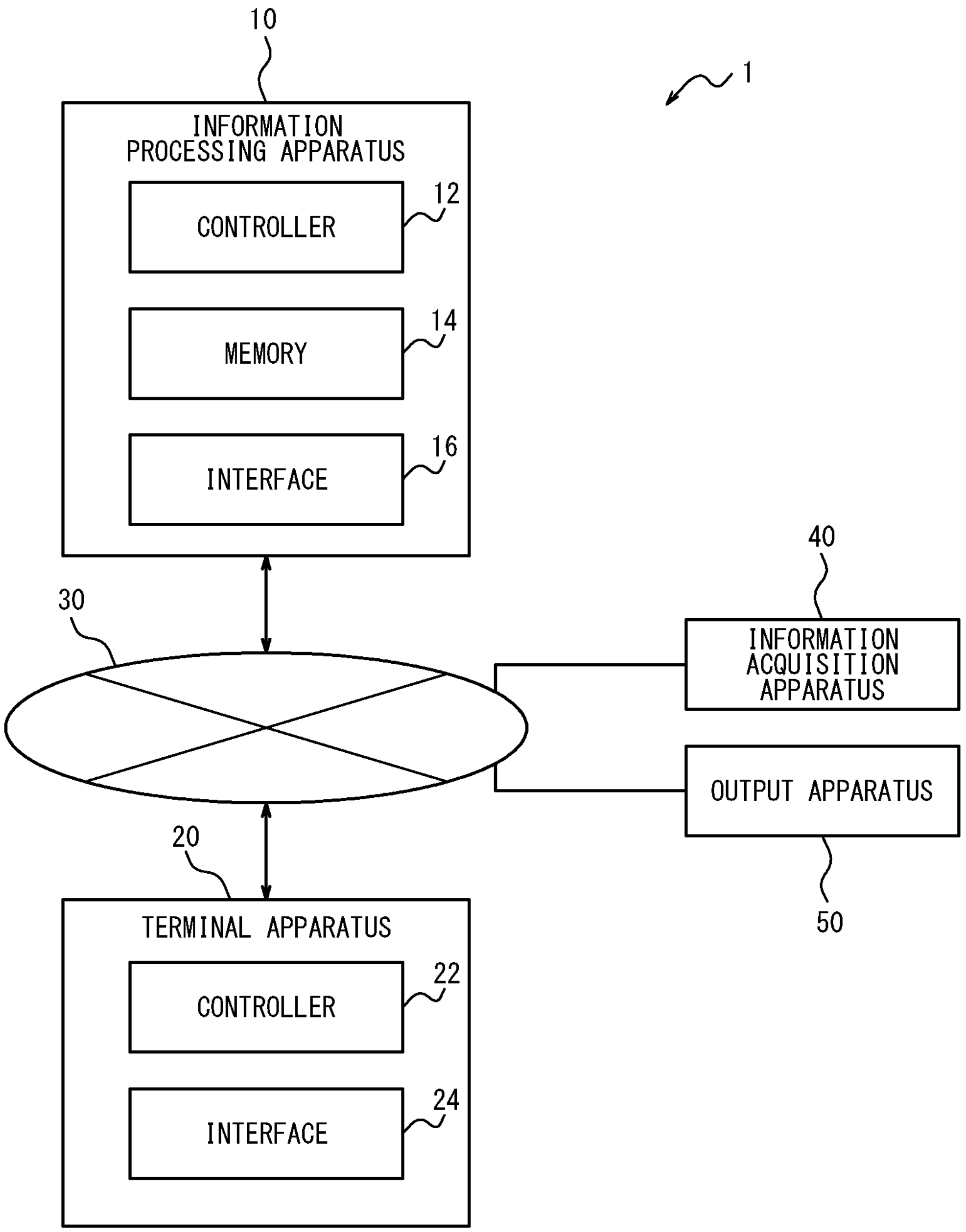
FIG. 1 is a block diagram illustrating an example configuration of an information processing system according to an embodiment.
Figure 2:
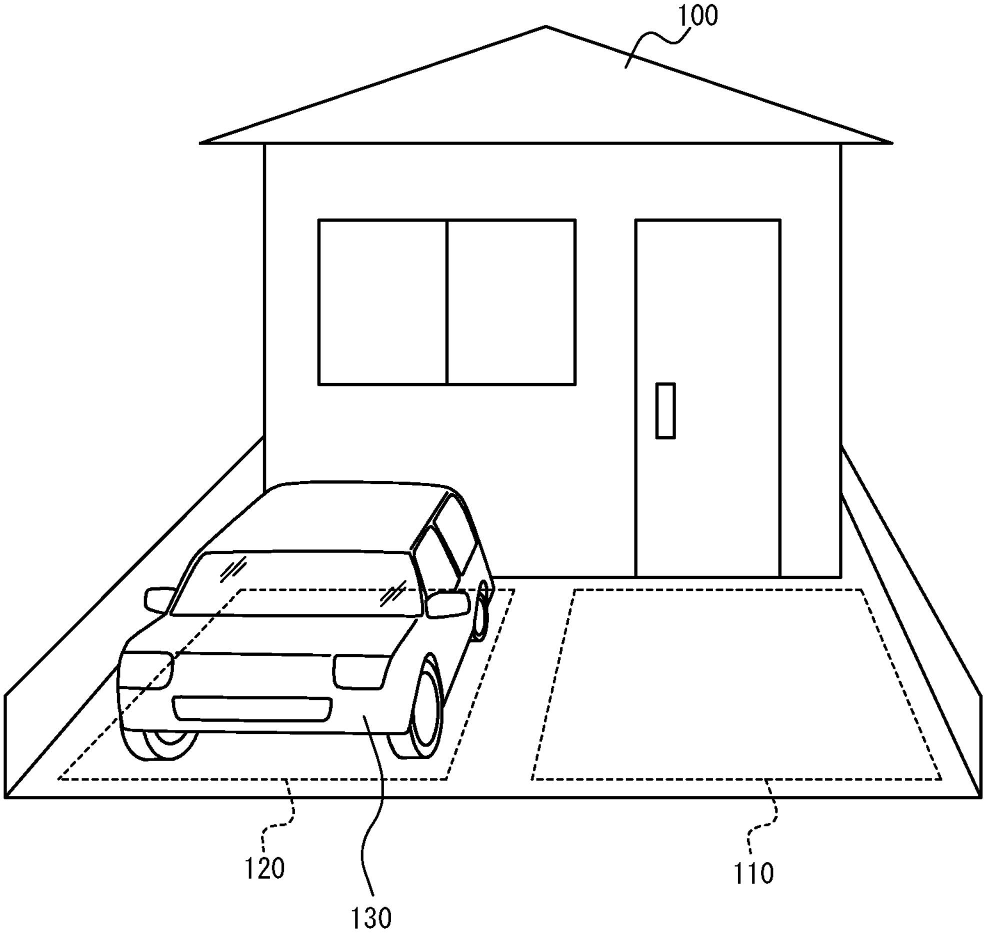
FIG. 2 is a schematic diagram illustrating an example of a parcel to be assigned as a parking slot.

As illustrated in FIG. 1, the information processing system 1 according to an embodiment includes an information processing apparatus 10 and an information acquisition apparatus 40. The information acquisition apparatus 40 acquires information regarding parcels. The information regarding parcels is also referred to as parcel information. The parcel information may include information on vacant spaces in a business district, residential area, or the like. The parcel information may include information on spaces that are temporarily vacant. As illustrated in FIG. 2, for example, the parcel information may include information regarding a first parcel 110 or a second parcel 120 that is present in front of a house 100.

The information processing apparatus 10 may determine, based on the parcel information, whether the parcel can be used as a parking slot. The information processing apparatus 10 may extract, based on the information regarding parcels including various vacant spaces, a parcel that can be used as a parking slot from the vacant spaces. In the example of FIG. 2, the information processing apparatus 10 may extract the vacant first parcel 110, as a parcel that can be used as a parking slot. The information processing apparatus 10 may extract the second parcel 120 in which a vehicle 130 is parked, as a parking slot that can be used while the vehicle 130 is out of the garage.

An example configuration of the information processing system 1 will be described below in the concrete.

<Information Processing Apparatus 10>

The information processing apparatus 10 includes a controller 12, a memory 14, and an interface 16.

The controller 12 controls at least one component of the information processing apparatus 10. The controller 12 may be configured to include at least one processor. The "processor" is a general purpose processor, a dedicated processor specialized for specific processing, or the like in the present embodiment but not limited to these. The controller 12 may be configured to include at least one dedicated circuit. The dedicated circuit may include, for example, a field-programmable gate array (FPGA) or an application specific integrated circuit (ASIC). The controller 12 may be configured with the dedicated circuit instead of the processor, or may be configured with the dedicated circuit along with the processor.

The memory 14 may be configured to include a semiconductor memory, a magnetic memory, an optical memory, or the like, for example, but not limited to these. The memory 14 may function as, for example, a main memory, an auxiliary memory, or a cache memory. The memory 14 may be configured to include an electromagnetic storage medium, such as a magnetic disk. The memory 14 may be configured to include a non-transitory computer readable medium. The memory 14 stores any information or program to be used for operations of the information processing apparatus 10. For example, the memory 14 may store a system program, an application program, or the like. The memory 14 may be included in the controller 12.

Information, data, or the like is outputted from and inputted to the controller 12 through the interface 16. The interface 16 may include a communication module for communication with other apparatuses, such as the information acquisition apparatus 40, via a network 30. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The interface 16 may be configured to be able to connect to a communication module.

The interface 16 may be configured with an input device for accepting input of information, data, or the like from a user. The input device may be configured with, for example, a touch panel, a touch sensor, or a pointing device such as a mouse. The input device may be configured with a physical key. The input device may be configured with an audio input device, such as a microphone. The interface 16 may be configured to be able to connect to an external input device. The interface 16 may be configured to be able to acquire, from the external input device, information or data input to the external input device.

The interface 16 may be configured to include an output device that outputs information, data, or the like to the user. The output device may include, for example, a display device that outputs visual information, such as images, letters, or graphics. The display device may be configured with, for example, a Liquid Crystal Display (LCD), an organic or inorganic Electro-Luminescence (EL) display, a Plasma Display Panel (PDP), or the like. The display device is not limited to the above displays and may be configured with various other types of displays. The display device may be configured with a light emitting device, such as a Light Emitting Diode (LED) or a Laser Diode (LD). The display device may be configured with various other devices. The output device may include, for example, an audio output device, such as a speaker that outputs audio information, such as voice. The output device is not limited to the above examples and may include various other devices. The interface 16 may be configured to be able to connect to an external output device. The interface 16 may be configured to be able to output information or data to the external output device.

The information processing apparatus 10 may be configured to include a single server apparatus or a plurality of server apparatuses capable of communicating with each other. The information processing apparatus 10 may be realized as a cloud server.

<Information Acquisition Apparatus 40>

The information acquisition apparatus 40 acquires parcel information and outputs the parcel information to the information processing apparatus 10.

The parcel information may include information representing a track record of a vacant status of a parcel. The information representing a track record of a vacant status of a parcel may include a time slot in which the parcel is unoccupied without the presence of a vehicle or an object such as luggage, or the length of time for which the parcel is unoccupied. When multiple parcels can be set up in a space, the information representing a track record of a vacant status of a parcel may include the number of vacant parcels in the space. The information representing a track record of a vacant status of a parcel may include information representing the number or size of vehicles that can be parked when the parcel is vacant. The information acquisition apparatus 40 may acquire the information representing a track record of a vacant status of a parcel, as images of the parcel. The information acquisition apparatus 40 may acquire the information representing a track record of a vacant status of a parcel, as detection results from a sensor installed in the parcel.

The information acquisition apparatus 40 may be configured as an in-vehicle camera mounted on a vehicle traveling on roads around a certain parcel, for example, to acquire images of the parcel as the parcel information. The information acquisition apparatus 40 may be configured as an in-vehicle camera mounted on a route bus or the like that regularly travels on roads around a certain parcel. The information acquisition apparatus 40 may output the images of the certain parcel captured by the in-vehicle camera, as information regarding the certain parcel. The information acquisition apparatus 40 may be configured, for example, as a movable or fixed surveillance camera that is installed to include a certain parcel in an imaging range. The information acquisition apparatus 40 may output images of the certain parcel captured by the surveillance camera, as information regarding the certain parcel. The information acquisition apparatus 40 may be configured, for example, as a drone, helicopter, aircraft, satellite, or the like that takes aerial photographs of an area including a certain parcel. The information acquisition apparatus 40 may output the aerial photographs of the certain parcel, as information regarding the certain parcel.

The information acquisition apparatus 40 may output, as information regarding the certain parcel, information associating the dates and times or location information at which the certain parcel is imaged with the images of the certain parcel. The information acquisition apparatus 40 may output, as information regarding the certain parcel, a combination of at least two images of the same parcel at at least two different dates and/or times. The information acquisition apparatus 40 may generate information representing a track record of a vacant status of the certain parcel based on the images of the certain parcel.

The parcel information may include the amount of traffic on roads passing through a predetermined area including a parcel. The information acquisition apparatus 40 may, for example, include a camera that images roads around a certain parcel and calculate the amount of traffic based on images of the roads around the certain parcel. The information acquisition apparatus 40 may include an interface to acquire the amount of traffic on roads around the parcel from an external apparatus such as a traffic control server. The information acquisition apparatus 40 may include an external apparatus such as a traffic control server. The parcel information may include, as the amount of traffic on roads around a parcel, the amount of traffic during morning or evening commuting hours, during daytime or nighttime hours, or the like. The parcel information may include, as the amount of traffic around a parcel, the amount of traffic at a particular time of year, for example, during a festival or other event.

The parcel information may include a time slot in which other parking slots located within a predetermined range including a parcel are in use or the utilization rates for the parking slots. In other words, the parcel information may include a time slot in which vehicles are parked in other parking slots around a parcel. The information acquisition apparatus 40 may include a camera that images other parking slots and calculate, based on images of the parking slots, a time slot in which the parking slots are in use or the utilization rates for the parking slots. The information acquisition apparatus may include sensors installed in other parking slots and calculate, based on results of detecting that vehicles are parked in the parking slots, a time slot in which the parking slots are in use or the utilization rates for the parking slots. The information acquisition apparatus 40 may include an interface to acquire a time slot in which other parking slots are in use or the utilization rates for the parking slots from an external apparatus such as a parking management server that manages the parking slots. The information acquisition apparatus 40 may include an external apparatus such as a parking management server.

The parcel information may include information regarding market parking fee rates for other parking slots located within a predetermined range including a parcel. The parcel information may include information on market parking fee rates for hourly parking slots and/or market parking fee rates for monthly parking slots. The information acquisition apparatus 40 may include a camera that images rate sheets displayed on other parking slots, and may acquire information regarding market parking fee rates for the parking slots based on the images of the rate sheets for the parking slots. The information acquisition apparatus 40 may include an interface to acquire information on market parking fee rates for other parking slots from an external apparatus such as a parking management server that manages the parking slots. The information acquisition apparatus 40 may include an external apparatus such as a parking management server.

The parcel information may include an occupancy rate for dwelling units within a predetermined range including a parcel or the number of years for which residents have lived. The occupancy rate for dwelling units or the number of years for which residents have lived is also referred to as resident data. The information acquisition apparatus 40 may include an interface to acquire the resident data for the dwelling units within the predetermined range including the parcel from an external apparatus such as a resident data server that manages the resident data. The information acquisition apparatus 40 may include an external apparatus such as a resident data server.

The parcel information may include information regarding various facilities such as public, commercial, or medical facilities located within a predetermined range including a parcel. The information regarding the facilities is also referred to as facility data. The information acquisition apparatus 40 may include an interface to acquire the facility data from an external apparatus such as a facility data server that manages the facility data. The information acquisition apparatus 40 may include an external apparatus such as a facility data server.

<Terminal Apparatus 20>

The information processing system 1 further includes a non-essential terminal apparatus 20. The terminal apparatus 20 is communicably connected to the information processing apparatus 10 or the information acquisition apparatus 40 via the network 30. The terminal apparatus 20 includes a controller 22 and an interface 24.

The controller 22 may be configured with one or more processors or one or more dedicated circuits. The controller 22 may be configured to be identical or similar to the controller 12 of the information processing apparatus 10. The controller 22 may be configured to include a memory. The memory may be configured to be identical or similar to the memory 14 of the information processing apparatus 10.

The interface 24 may be configured to include an input device, an output device, or a communication device. The interface 24 may be configured to be identical or similar to the interface 16 of the information processing apparatus 10. The interface 24 may be wired or wirelessly communicably connected to the information processing apparatus 10 or the information acquisition apparatus 40.

The terminal apparatus 20 may be carried by a user or may be installed in a predetermined location. The terminal apparatus 20 may be configured as a mobile terminal, such as a smartphone or a tablet, or a Personal Computer (PC), such as a notebook PC or a tablet PC. The terminal apparatus 20 is not limited to the above examples and may include various devices. The number of terminal apparatuses 20 included in the information processing system 1 is not limited to one and may be two or more.

<Output Apparatus 50>

The information processing system 1 further includes a non-essential output apparatus 50. The output apparatus 50 is communicably connected to the information processing apparatus 10, the information acquisition apparatus 40, or the terminal apparatus 20 via the network 30. The output apparatus 50 may be installed in a parcel that can be used as a parking slot.

The output apparatus 50 may include, for example, a display apparatus. When a parcel is assigned as a parking slot, the display apparatus may display the word “empty” or similar text to indicate that the parcel is available for parking a vehicle. When a parcel is not assigned as a parking slot, the display apparatus may display the word “full” or similar text to indicate that the parcel is unavailable for parking a vehicle. The display apparatus may display the word “monthly” or similar text when a parcel is assigned as a monthly parking slot. The display apparatus may display the word “hourly” or similar text when a parcel is assigned as an hourly parking slot. The display apparatus may display a variety of other characters, not limited to those in the examples, and may also display symbols, graphics, or images.

The output apparatus 50 may include, for example, an entry restriction apparatus. The entry restriction apparatus may include a gate or a flap board that restricts entry of a vehicle into a parcel. When a parcel is assigned as a parking slot, the entry restriction apparatus may open the gate or lower the flap board to allow a vehicle to enter the parcel. When a parcel is not assigned as a parking slot, the entry restriction apparatus may close the gate or raise the flap board to prevent a vehicle from entering the parcel. When a parcel is assigned as a monthly parking slot, the entry restriction apparatus may open the gate or lower the flap board at operation of a user who has contracted to park on a monthly basis. The entry restriction apparatus may be equipped with a sensor that detects a vehicle contracted to park on a monthly basis, and open the gate or lower the flap board when the vehicle is detected.

(Example Operations of Information Processing System 1)

In the information processing system 1 according to the present embodiment, the controller 12 of the information processing apparatus 10 acquires parcel information from the information acquisition apparatus 40. The controller 12 may extract, based on the parcel information, a parcel that can be used as a parking slot. The controller 12 may determine, based on the parcel information, whether the parcel can be used as a parking slot. The controller 12 may assign, as a parking slot, the parcel that can be used as a parking slot. Specific example operations of the controller 12 assigning a parcel as a parking slot will be described below.

<Estimation of Vacant Status of Parcel>

The controller 12 can assign a parcel as a parking slot when the parcel is vacant. The controller 12 may estimate a vacant status of the parcel based on the parcel information. The controller 12 may estimate a vacant status of the parcel based on information representing a track record of a vacant status of the parcel. The controller 12 may estimate a vacant status of the parcel based on images of the parcel. The controller 12 may estimate a vacant status of the parcel based on a detection result of a sensor installed in the parcel.

The controller 12 may estimate, as the vacant status of the parcel, the length of time for which the parcel is vacant. The controller 12 may estimate, as the vacant status of the parcel, a trend of timing when the parcel becomes vacant. The controller 12 may estimate, as the trend of timing when the parcel becomes vacant, for example, a time slot in which the parcel becomes vacant. The controller 12 may estimate, as the trend of timing when the parcel becomes vacant, for example, the day of the week when the parcel becomes vacant, or a specific time of the month, such as early or late in the month or at the beginning or end of the month, when the parcel becomes vacant.

The controller 12 may determine, based on an estimation result of the vacant status of the parcel, whether the parcel can be used as a parking slot. The controller 12 may determine, based on an estimation result of the vacant status of the parcel, whether the parcel can be used as a monthly or hourly parking slot. The controller 12 may calculate, based on an estimation result of the vacant status of the parcel, a time period during which the parcel can be used as a parking slot, and determine a time period during which the parcel is assigned as a parking slot.

When the parcel is estimated to be vacant at a specific time slot or time period, for example, the controller 12 may determine that the parcel can be used as a parking slot at the specific time slot or time period. When the parcel is estimated to be vacant for an extended period of time, the controller 12 may determine that the parcel can be used as a monthly parking slot. When the parcel is estimated to be vacant at a particular time slot, the controller 12 may determine that the parcel can be used as a monthly parking slot for the particular time slot only.

<Calculation of Potential as Parking Slot>

The controller 12 may calculate, based on information regarding a certain parcel, potential for assigning the certain parcel as a parking slot. The potential for assigning the certain parcel as a parking slot may include, for example, a predicted value of a utilization rate for the certain parcel as a parking slot. In other words, the potential for assigning the certain parcel to a parking slot may include a predicted value of a percentage of time a vehicle is parked when the certain parcel is used as a parking slot. The potential for assigning the certain parcel to a parking slot may include, for example, a projected value of revenue from assigning the certain parcel as a parking slot.

The controller 12 may estimate a parking demand for the certain parcel based on the information regarding the certain parcel, in order to calculate the potential for assigning the certain parcel as a parking slot.

For example, the controller 12 may estimate, as the parking demand, a utilization rate when the certain parcel is assigned as a parking slot, based on utilization rates for other parking slots around the certain parcel. For example, the controller 12 may estimate, as the parking demand for the certain parcel, a time slot in which a utilization rate is high when the certain parcel is assigned as a parking slot, based on time slots in which other parking slots around the certain parcel are in use.

For example, the controller 12 may estimate, as the parking demand, a utilization rate when the certain parcel is assigned as a parking slot, based on the amount of traffic on roads around the certain parcel. For example, the controller 12 may estimate, as the parking demand for the certain parcel, a time slot in which a utilization rate is high when the certain parcel is assigned as a parking slot, based on the amount of traffic on roads around the certain parcel for each time slot.

For example, the controller 12 may estimate a demand when the certain parcel is assigned as a monthly parking slot, based on resident data around the certain parcel. The controller 12 may estimate how often residents are replaced (moved) based on the number of years for which the residents have lived. When there is a high turnover of residents, the controller 12 may estimate that there is a high demand for the certain parcel assigned as a monthly parking slot. When there is a low turnover of residents, the controller 12 may estimate that there is a high demand for the certain parcel assigned as a monthly parking slot. The controller 12 may estimate a time period in which other parking slots around the certain parcel become available based on the number of years for which the residents have lived.

For example, the controller 12 may estimate, as the parking demand, a utilization rate when the certain parcel is assigned as a parking slot, based on facility data around the certain parcel. For example, the controller 12 may estimate, as the parking demand, a time slot in which a utilization rate is high when the certain parcel is assigned as a parking slot, based on time slots in which facilities around the certain parcel are heavily used. For example, the controller 12 may estimate a demand when the certain parcel is assigned as a monthly parking slot, based on parking space data on the facilities around the certain parcel. When there are few parking slots in the nearby facilities, the controller 12 may estimate that there is a large demand for monthly parking slots from the facilities. When there are few parking slots in the nearby facilities, the controller 12 may estimate that there is a large demand for hourly parking slots. When there is a temporary increase in the number of users of the nearby facilities, the controller 12 may estimate that there is a large demand for hourly parking slots.

Based on the estimated parking demand for the certain parcel, the controller 12 may calculate, as the potential, a predicted value of a utilization rate for or revenue from assigning the certain parcel as a parking slot. The controller 12 may calculate each of potential for assigning the certain parcel to a monthly parking slot and potential for assigning the certain parcel to an hourly parking slot.

The controller 12 may estimate a parking fee rate that can be set when the certain parcel is assigned as a parking slot, based on market parking fee rates for other parking slots around the certain parcel. Based on an estimated value of the settable parking fee rate, the controller 12 may calculate, as the potential, a predicted value of a utilization rate for or revenue from assigning the certain parcel as a parking slot. Based on an estimated value of the settable parking fee rate for an hourly parking slot, the controller 12 may calculate, as the potential, a predicted value of a utilization rate for or revenue from assigning the certain parcel as an hourly parking slot. Based on an estimated value of the settable parking fee rate for a monthly parking slot, the controller 12 may calculate, as the potential, a predicted value of a utilization rate for or revenue from assigning the certain parcel as a monthly parking slot.

<Assignment as Parking Slot>

The controller 12 may generate information suggesting to a lending user, such as an owner or manager of a parcel that is determined to be usable as a parking slot, that the parcel is assigned as either an hourly or monthly parking slot. The controller 12 may generate information suggesting to a lending user, such as an owner or manager of a parcel that is determined to be usable as a parking slot, that the parcel can be assigned as either an hourly or monthly parking slot. The information suggesting to assign the parcel as a parking slot is also referred to as assignment suggestion information. The controller 12 may output the assignment suggestion information to the terminal apparatus 20 of the lending user.

The controller 12 may output, as the assignment suggestion information, a calculation result of potential for assigning the parcel as a parking slot. When the parcel is usable as either an hourly or monthly parking slot, the controller 12 may output, as the assignment suggestion information, information allowing a comparison between a calculation result of potential for assigning the parcel as an hourly parking slot and a calculation result of potential for assigning the parcel as a monthly parking slot. The controller 12 may output, as the assignment suggestion information, a utilization prediction when the parcel is assigned as a parking slot. The controller 12 may output, as the assignment suggestion information, information regarding a parking fee rate that is set when the parcel is assigned as a parking slot. The controller 12 may output, as the assignment suggestion information, information suggesting that the parcel is assigned as an hourly parking slot only during specific daytime hours and as a monthly parking slot during the other time slot.

The controller 22 of the terminal apparatus 20 may output the assignment suggestion information using the output device of the interface 24, to notify the lending user of the assignment suggestion information. The controller 22 may accept, using the input device of the interface 24, an input to determine whether the lending user accepts the suggestion to assign the parcel as a parking slot. The controller 22 may accept, using the input device of the interface 24, an input to determine whether the lending user assigns the parcel as an hourly parking slot or a monthly parking slot. The controller 22 may accept, using the input device of the interface 24, an input to determine a parking fee rate that is set when the lending user assigns the parcel as a parking slot. The controller 22 may output the inputs of the lending user to the information processing apparatus 10.

The controller 12 of the information processing apparatus 10 may determine to assign the parcel as a parking slot based on the input from the lending user. The controller 12 may determine, based on the input of the lending user, whether the parcel is assigned as an hourly parking slot or a monthly parking slot. The controller 12 may generate information representing that the parcel has been assigned as an hourly parking slot or a monthly parking slot. The information representing that the parcel has been assigned as a parking slot is also referred to as assignment determination information. The controller 12 may determine a parking fee rate to be set for the parking slot. The assignment determination information may include information on the parking fee rate to be set for the parking slot. The controller 12 may output the assignment determination information to the terminal apparatus 20 of the lending user. The controller 22 of the terminal apparatus 20 may output the assignment determination information using the output device of the interface 24, to notify the lending user of the assignment determination information.

The controller 12 may notify the assignment suggestion information to the terminal apparatus 20 that is in the possession of a representative of a contractor managing parking slots. Based on the assignment suggestion information, the representative may negotiate with an owner or manager of a parcel that can be used as a parking slot and enter into an agreement to assign the parcel as a parking slot.

The lending user may wish to delegate, to the information processing apparatus 10, determination whether to assign the parcel as a parking slot, determination whether to assign the parcel as an hourly or monthly parking slot, or determination of a parking fee rate to be set for the parking slot. The controller 22 of the terminal apparatus 20 may accept, by the input device of the interface 24, and output, to the information processing apparatus 10, an input indicating a willingness of the lending user to delegate to the information processing apparatus 10 a determination regarding assignment of the parcel as a parking slot. Upon being delegated by the lending user to make a determination regarding assignment of the parcel to a parking slot, the controller 12 of the information processing apparatus 10 may automatically determine whether to actually assign the parcel, which has been determined to be usable as a parking slot, as an hourly or monthly parking slot without generating the assignment suggestion information. The controller 12 may automatically determine a parking fee rate to be set for the parking slot. Upon determining to assign the parcel as a parking slot, the controller 12 may generate assignment determination information and output the assignment determination information to the terminal apparatus 20 of the lending user.

The controller 12 may determine whether to actually assign the parcel as a parking slot, based on a calculation result of potential when the parcel is assigned as a parking slot. For example, the controller 12 may determine to assign the parcel as a parking slot when a predicted value of revenue from assigning the parcel as a parking slot is above a revenue threshold. For example, the controller 12 may determine to assign the parcel as a parking slot when a predicted value of a utilization rate when the parcel is assigned as a parking slot is above a utilization rate threshold. The revenue threshold or utilization rate threshold can be determined based on, for example, cost or the like incurred when the parcel is assigned as a parking slot. In other words, the controller 12 may determine to assign the parcel to a parking slot when the calculation result of the potential meet conditions.

Both the assignment suggestion information and the assignment determination information are information regarding assignment of the parcel as a parking slot, and also collectively referred to as assignment information.

<Management of Parking Slot>

The controller 12 of the information processing apparatus 10 may output the assignment determination information to a parking slot management server that manages parking slots. The parking slot management server may generate, based on the assignment determination information, a database to manage the parking slots. The parking slot management server may provide, based on the database, a service to introduce the parking slots to using users. This facilitates increasing utilization rates or revenue of the parking slots. The controller 12 may output the assignment determination information to the terminal apparatus 20 of the using user through an external apparatus such as the parking slot management server, or to the terminal apparatus 20 of the using user without passing through the external apparatus. The controller 12 may perform the functions of the parking slot management server. The parking slot management server may provide a service to introduce both hourly and monthly parking slots. The parking slot management server may provide a service to introduce hourly parking slots and/or monthly parking slots. The parking slot management server may provide a service to introduce parking slots available for either on a hourly or monthly basis. Introducing monthly parking slots makes it easier for residents, employees, or the like around the parcel to find a place to park for an extended period of time. In addition, the need for a garage certificate at the time of purchase of a vehicle could be met.

The controller 12 may generate a utilization prediction for the parking slots and output the utilization prediction to the terminal apparatus 20 of the using user. This enables the using users to recognize vacant statuses of the parking slots, thus facilitating using the parking slots. In addition, the using users are more likely to visit the vicinity of the parking slots with vehicles when the using users have the prospect of being able to park the vehicles. The controller 12 may change some of the hourly parking slots to monthly parking slots, based on utilization predictions for the hourly parking slots. When lending users have not delegated determination of assignment of parcels as parking slots, the controller 12 may generate information suggesting changing the hourly parking slots to monthly parking slots, and notify the lending users of the information to acquire determination of the lending users.

When a certain parcel is assigned as a parking slot, the controller 12 may output assignment determination information to the output apparatus 50 installed in the certain parcel. The output apparatus 50 may output information based on the assignment determination information so that using users can recognize a status of the certain parcel. For example, a display apparatus, as the output apparatus 50, may indicate whether the certain parcel is assigned as a parking slot. For example, an entry restriction apparatus, as the output apparatus 50, may open a gate or lower a flap board when the certain parcel is available for parking.

<Example Procedure for Information Processing Method>

Figure 3:
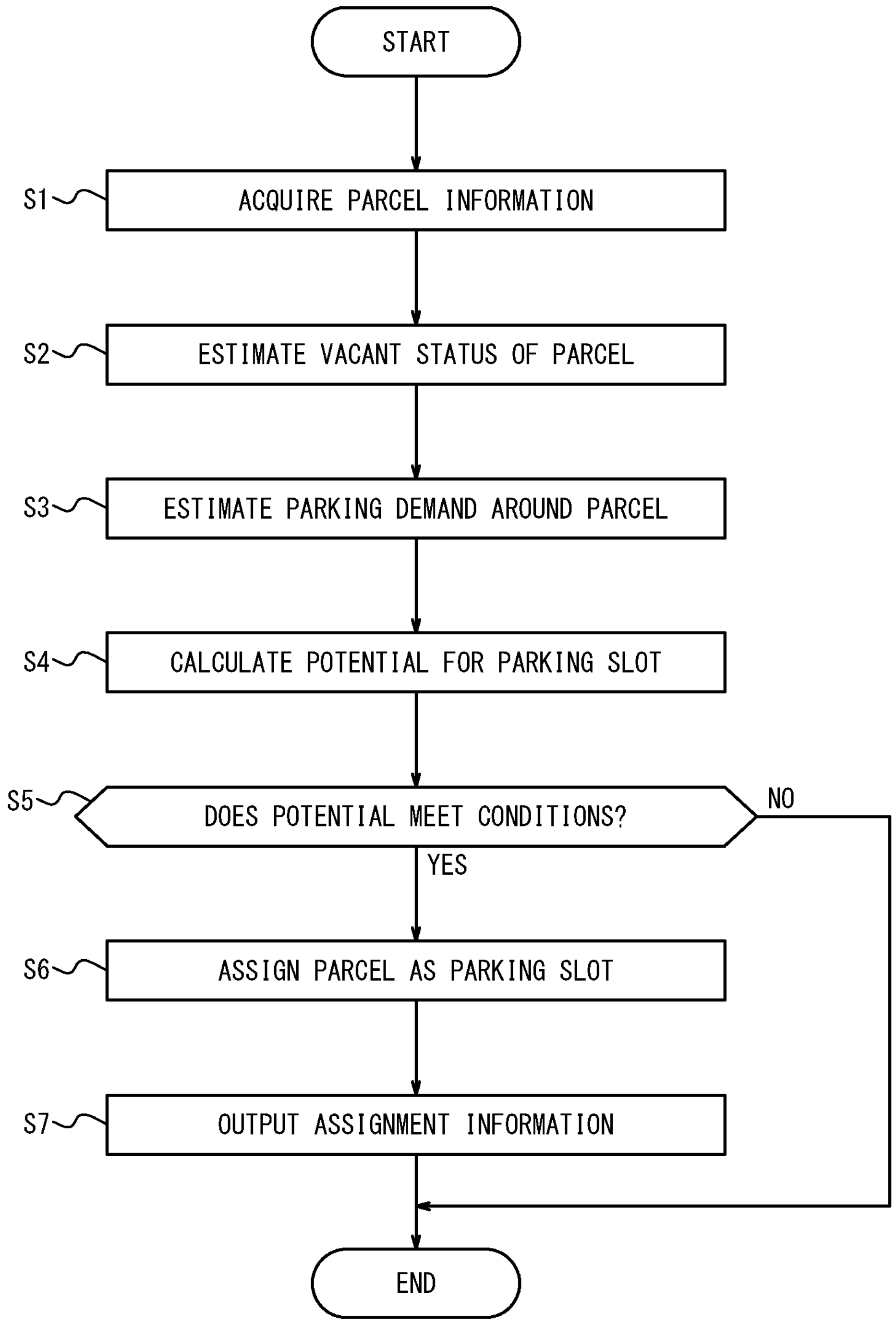
FIG. 3 is a flowchart illustrating an example procedure for an information processing method according to the embodiment.

The controller 12 of the information processing apparatus 10 according to the present embodiment may perform an information processing method including a procedure of the flowchart in FIG. 3, for example, to assign a parcel as a parking slot. In the procedure of the flowchart in FIG. 3, the controller 12 determines to assign a parcel as a parking slot. The information processing method may be implemented as an information processing program to be executed by the controller 12. The information processing program may be stored on a non-transitory computer readable medium.

The controller 12 acquires parcel information (step S1). Based on the parcel information, the controller 12 estimates a vacant status of a parcel (step S2). Based on the parcel information, the controller 12 estimates a parking demand around the parcel (step S3). Based on an estimation result of the parking demand, the controller 12 calculates potential of the parcel as a parking slot (potential when the parcel is assigned as a parking slot) (step S4).

The controller 12 determines whether the potential meets conditions (step S5). When the potential does not meet the conditions (NO in step S5), the controller 12 ends execution of the procedure of the flow chart in FIG. 3, without assigning the parcel as a parking slot. When the potential meets the conditions (YES in step S5), the controller 12 assigns the parcel as a parking slot (step S6). The controller 12 generates assignment determination information, as assignment information, and outputs the assignment determination information to the terminal apparatus 20 of a lending user and the like. (step S7). After performing the process of step S7, the controller 12 ends the execution of the procedure of the flowchart in FIG. 3.

Figure 4:
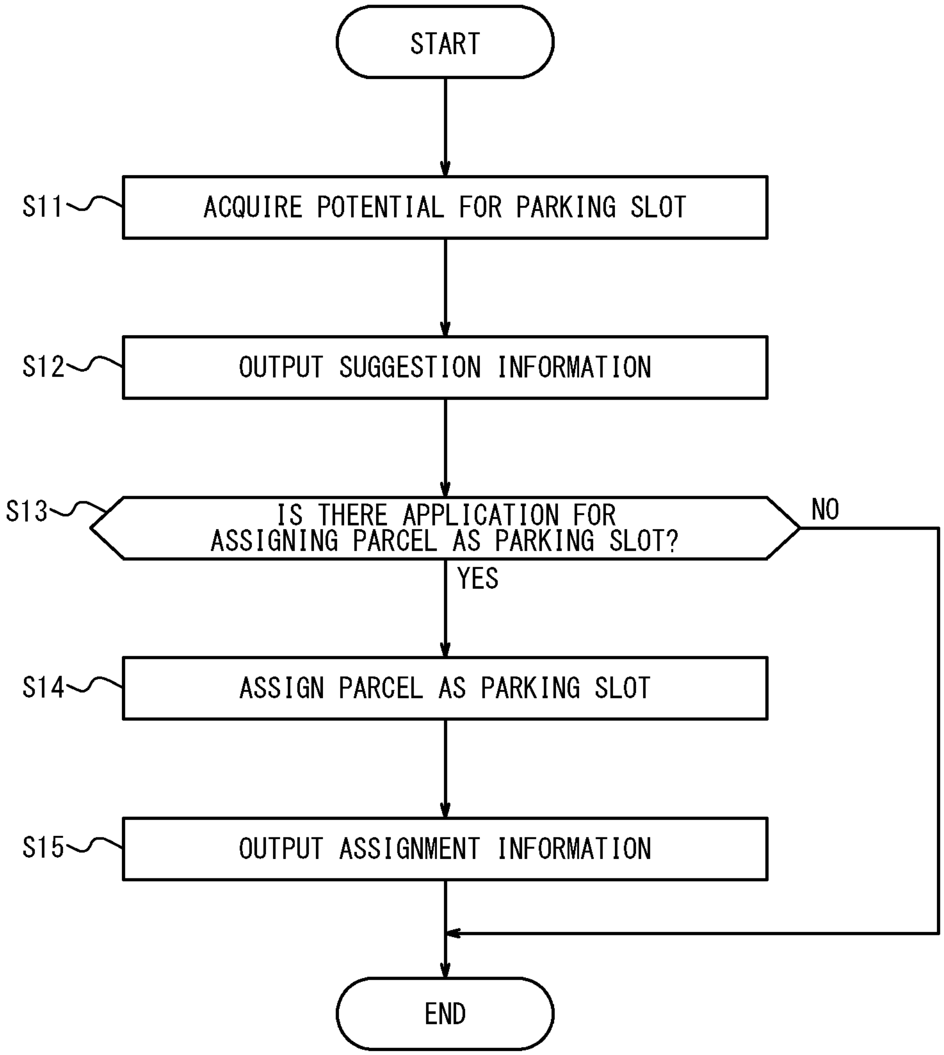
FIG. 4 is a flowchart illustrating an example procedure for the information processing method according to another embodiment.

The controller 12 may, for example, perform an information processing method including the procedure of the flowchart in FIG. 4. In the procedure of the flowchart in FIG. 4, a lending user determines to assign a parcel as a parking slot.

The controller 12 acquires potential of a parcel as a parking slot (potential when a parcel is assigned as a parking slot), which is calculated in steps S1 to S4 of FIG. 3 (step S11). The controller 12 generates assignment suggestion information (suggestion information) and outputs the assignment suggestion information to the terminal apparatus 20 of a lending user (step S12).

The controller 12 determines whether there is an application by the lending user for assigning the parcel as a parking slot in the terminal apparatus 20 (step S13). Specifically, the controller 12 acquires, from the terminal apparatus 20, and determines information input by the lending user in the terminal apparatus 20. When there is no application for assigning the parcel as a parking slot (NO in step S13), the controller 12 ends the procedure of the flowchart in FIG. 4. When there is an application for assigning the parcel as a parking slot (YES in step S13), the controller 12 assigns the parcel as a parking slot (step S14). The controller 12 generates assignment determination information, as assignment information, and outputs the assignment determination information to the terminal apparatus 20 of the lending user and the like (step S15). After performing the process of step S15, the controller 12 ends the execution of the procedure of the flowchart in FIG. 4.

<Summary>

As described above, according to the information processing system 1, information processing apparatus 10, information processing method, and information processing program of the present embodiments, whether a parcel can be used as a parking slot can be determined. This facilitates effective use of vacant spaces usable for parking, as parking spaces. In addition, parcels can be assigned as hourly parking slots and/or monthly parking slots. In this way, parking slots can be provided in a form that meets demand by using users.

While embodiments of the present disclosure have been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

Examples of some embodiments of the present disclosure are described below. However, it should be noted that the embodiments of the present disclosure are not limited to these.

[Appendix 1] An information processing apparatus comprising:

- an interface configured to be able to acquire information regarding a parcel; and
- a controller configured to generate, based on the information regarding the parcel, information regarding assignment of the parcel as a parking slot.

[Appendix 2] The information processing apparatus according to appendix 1, wherein the controller is configured to:

- calculate, based on the information regarding the parcel, potential for assigning the parcel as a parking slot; and
- determine, based on a calculation result of the potential, whether to assign the parcel as a parking slot.

[Appendix 3] The information processing apparatus according to appendix 2, wherein the potential for assigning the parcel as a parking slot includes a predicted value of a utilization rate for the parcel as a parking slot, or a predicted value of revenue from assigning the parcel as a parking slot.

[Appendix 4] The information processing apparatus according to appendix 2 or 3, wherein the potential for assigning the parcel as a parking slot includes potential for assigning the parcel as a monthly parking slot, or potential for assigning the parcel as an hourly parking slot.

[Appendix 5] The information processing apparatus according to any one of appendices 1 to 4, wherein the controller is configured to:

- estimate a vacant status of the parcel based on the information regarding the parcel; and
- determine, based on an estimation result of the vacant status of the parcel, whether to assign the parcel as a parking slot.

[Appendix 6] The information processing apparatus according to appendix 5, wherein the controller is configured to determine, based on the estimation result of the vacant status of the parcel, whether to assign the parcel as a monthly parking slot or an hourly parking slot.

[Appendix 7] The information processing apparatus according to appendix 5 or 6, wherein the controller is configured to determine, based on the estimation result of the vacant status of the parcel, a time period during which the parcel is to be assigned as a parking slot.

[Appendix 8] The information processing apparatus according to any one of appendices 1 to 7, wherein the information regarding the parcel includes information representing a track record of a vacant status of the parcel.

[Appendix 9] The information processing apparatus according to appendix 8, wherein the information representing the track record of the vacant status of the parcel includes information representing a time slot in which the parcel is vacant, or a number or size of vehicles that can be parked in the parcel when the parcel is vacant.

[Appendix 10] The information processing apparatus according to appendix 8 or 9, wherein the information representing the track record of the vacant status of the parcel includes an image of the parcel.

[Appendix 11] The information processing apparatus according to appendix 10, wherein the image of the parcel includes images of the parcel at at least two different dates and/or times.

[Appendix 12] The information processing apparatus according to any one of appendices 1 to 11, wherein the information regarding the parcel includes an amount of traffic on a road passing through a predetermined range including the parcel, a time slot in which a parking slot located within the predetermined range including the parcel is in use or a utilization rate for the parking slot, or an occupancy rate for a dwelling unit in the predetermined range including the parcel or a number of years for which a resident has lived.

[Appendix 13] The information processing apparatus according to any one of appendices 1 to 12, wherein the controller is configured to output information assigning the parcel as a parking slot to a terminal apparatus carried by a user who lends or uses the parcel.

[Appendix 14] The information processing apparatus according to appendix 13, wherein the controller is configured to output, to the terminal apparatus, a utilization prediction when the parcel is assigned as a parking slot.

[Appendix 15] The information processing apparatus according to any one of appendices 1 to 14, wherein the controller is configured to output information assigning the parcel as a parking slot to an output apparatus installed in the parcel.

[Appendix 16] An information processing method comprising:

- acquiring information regarding a parcel; and
- generating, based on the information regarding the parcel, information regarding assignment of the parcel as a parking slot.

[Appendix 17] The information processing method according to appendix 16, further comprising:

- calculating, based on the information regarding the parcel, potential for assigning the parcel as a parking slot; and
- determining, based on a calculation result of the potential for assigning the parcel as a parking slot, whether to assign the parcel as a parking slot.

[Appendix 18] The information processing method according to appendix 16 or 17, further comprising:

- estimating a vacant status of the parcel based on the information regarding the parcel; and
- determining, based on an estimation result of the vacant status of the parcel, whether to assign the parcel as a parking slot.

[Appendix 19] The information processing method according to appendix 18, further comprising determining, based on the estimation result of the vacant status of the parcel, whether to assign the parcel as a monthly parking slot or an hourly parking slot.

[Appendix 20] An information processing program configured to cause a processor to execute operations, the operations comprising:

- acquiring information regarding a parcel; and
- generating, based on the information regarding the parcel, information regarding assignment of the parcel as a parking slot.

The invention claimed is:

1. An information processing apparatus comprising:

an interface configured to acquire information regarding a parcel, the information regarding the parcel including an occupancy rate for a dwelling unit within a predetermined range including the parcel or a number of years for which a resident has lived; and a controller configured to:

estimate a parking demand for the parcel based on the information regarding the parcel, calculate, based on a result of the estimation, potential for assigning the parcel as a parking slot, determine, based on a result of the calculation, whether to assign the parcel as a parking slot, based on the determination of whether to assign the parcel as a parking slot, control an output apparatus installed in the parcel, wherein the output apparatus includes an entry restriction apparatus including a gate or a flap board, and the controller is further configured to based on determining to assign the parcel as a parking slot, control the entry restriction apparatus to open the gate or lower the flap board to allow a vehicle to enter the parcel, and based on determining not to assign the parcel as a parking slot, control the entry restriction apparatus to close the gate or raise the flap board to prevent a vehicle from entering the parcel.

2. The information processing apparatus according to claim 1, wherein the potential for assigning the parcel as a parking slot includes a predicted value of a utilization rate for the parcel as a parking slot, or a predicted value of revenue from assigning the parcel as a parking slot.

3. The information processing apparatus according to claim 1, wherein the potential for assigning the parcel as a parking slot includes potential for assigning the parcel as a monthly parking slot, or potential for assigning the parcel as an hourly parking slot.

4. The information processing apparatus according to claim 1, wherein the controller is configured to:

estimate a vacant status of the parcel based on the information regarding the parcel; and determine, based on an estimation result of the vacant status of the parcel, whether to assign the parcel as a parking slot.

5. The information processing apparatus according to claim 4, wherein the controller is configured to determine, based on the estimation result of the vacant status of the parcel, whether to assign the parcel as a monthly parking slot or an hourly parking slot.

6. The information processing apparatus according to claim 4, wherein the controller is configured to determine, based on the estimation result of the vacant status of the parcel, a time period during which the parcel is to be assigned as a parking slot.

7. The information processing apparatus according to claim 1, wherein the information regarding the parcel includes information representing a track record of a vacant status of the parcel.

8. The information processing apparatus according to claim 7, wherein the information representing the track record of the vacant status of the parcel includes information representing a time slot in which the parcel is vacant, or a number or size of vehicles that can be parked in the parcel when the parcel is vacant.

9. The information processing apparatus according to claim 7, wherein the information representing the track record of the vacant status of the parcel includes an image of the parcel.

10. The information processing apparatus according to claim 9, wherein the image of the parcel includes images of the parcel at at least two different dates and/or times.

11. The information processing apparatus according to claim 1, wherein the information regarding the parcel includes an amount of traffic on a road passing through the predetermined range including the parcel, a time slot in which a parking slot located within the predetermined range including the parcel is in use, or a utilization rate for the parking slot.

12. The information processing apparatus according to claim 1, wherein the controller is configured to output information assigning the parcel as a parking slot to a terminal apparatus carried by a user who lends or uses the parcel.

13. The information processing apparatus according to claim 12, wherein the controller is configured to output, to the terminal apparatus, a utilization prediction when the parcel is assigned as a parking slot.

14. The information processing apparatus according to claim 1, wherein the controller is configured to output information assigning the parcel as a parking slot to the output apparatus installed in the parcel.

15. An information processing method comprising:

acquiring information regarding a parcel, the information regarding the parcel including an occupancy rate for a dwelling unit within a predetermined range including the parcel or a number of years for which a resident has lived;

estimating a parking demand for the parcel based on the information regarding the parcel;

calculating, based on a result of the estimation, potential for assigning the parcel as a parking slot;

determining, based on a result of the calculation, whether to assign the parcel as a parking slot;

based on the determination of whether to assign the parcel as a parking slot, controlling an output apparatus installed in the parcel, wherein the output apparatus includes an entry restriction apparatus including a gate or a flap board;

based on determining to assign the parcel as a parking slot, controlling the entry restriction apparatus to open the gate or lower the flap board to allow a vehicle to enter the parcel; and based on determining not to assign the parcel as a parking slot, controlling the entry restriction apparatus to close the gate or raise the flap board to prevent a vehicle from entering the parcel.

16. The information processing method according to claim 15, further comprising:

estimating a vacant status of the parcel based on the information regarding the parcel; and determining, based on an estimation result of the vacant status of the parcel, whether to assign the parcel as a parking slot.

17. The information processing method according to claim 16, further comprising determining, based on the estimation result of the vacant status of the parcel, whether to assign the parcel as a monthly parking slot or an hourly parking slot.

18. A non-transitory computer readable medium storing an information processing program configured to cause a processor to execute operations, the operations comprising:

acquiring information regarding a parcel, the information regarding the parcel including an occupancy rate for a dwelling unit within a predetermined range including the parcel or a number of years for which a resident has lived;

estimating a parking demand for the parcel based on the information regarding the parcel;

calculating, based on a result of the estimation, potential for assigning the parcel as a parking slot;

determining, based on a result of the calculation, whether to assign the parcel as a parking slot;

based on the determination of whether to assign the parcel as a parking slot, controlling an output apparatus installed in the parcel, wherein the output apparatus includes an entry restriction apparatus including a gate or a flap board;

based on determining to assign the parcel as a parking slot, controlling the entry restriction apparatus to open the gate or lower the flap board to allow a vehicle to enter the parcel; and based on determining not to assign the parcel as a parking slot, controlling the entry restriction apparatus to close the gate or raise the flap board to prevent a vehicle from entering the parcel.

19. The information processing apparatus according to claim 1, wherein the output apparatus further includes a display, and the controller is further configured to based on determining to assign the parcel as a parking slot, control the display to output first information indicating that the parcel is available for parking a vehicle, and based on determining not to assign the parcel as a parking slot, control the display to output second information indicating that the parcel is unavailable for parking a vehicle.

20. The information processing apparatus according to claim 1, wherein the controller is further configured to estimate how often the resident is replaced, based on the number of years for which the resident has lived, to estimate the parking demand for the parcel.

* * * * *